United States Patent [19]

Madsen

[11] 4,092,247
[45] May 30, 1978

[54] METHOD AND APPARATUS FOR DEWATERING THICKENED SLUDGE

[75] Inventor: Rud Frik Madsen, Nakskov, Denmark

[73] Assignee: Aktieselskabet de Danske Sukkerfabrikker, Nakskov, Denmark

[21] Appl. No.: 753,100

[22] Filed: Dec. 21, 1976

[30] Foreign Application Priority Data

Dec. 23, 1975 United Kingdom ............ 52660/75

[51] Int. Cl.² .................. B01D 33/22; C02C 1/18
[52] U.S. Cl. ........................ 210/67; 100/42; 100/90; 100/187; 100/218; 100/223; 210/70; 210/73 R; 210/77; 210/82; 210/138; 210/152; 210/241; 210/251; 210/297; 210/314; 210/350; 210/386; 210/393; 210/406; 210/411; 210/416 R; 210/455
[58] Field of Search ............ 210/65, 66, 294, 350, 210/351, 359, 402–404, 406, 67, 70, 73 R, 77, 79, 80, 82, 81, 138, 152, 241, 251, 295, 297, 314, 386, 391, 393, 411, 416 R, 455; 100/35, 187, 340, 90, 218, 223, 42, 221

[56] References Cited

U.S. PATENT DOCUMENTS

| 761,686 | 6/1904 | Kirshner | 100/218 |
| 3,552,454 | 1/1971 | Deming | 100/223 |
| 3,772,144 | 11/1973 | Luthi et al. | 100/90 |

*Primary Examiner*—Frank Sever
*Attorney, Agent, or Firm*—Watson, Cole, Grindle & Watson

[57] ABSTRACT

Process for dewatering thickened sludge comprising the steps of depositing thickened sludge onto a porous support, partially dewatering the thickened sludge by establishing a vacuum within said porous support, compressing the partially dewatered sludge on said porous support at a pressure of from 1 to 10 kp/cm² to further dewater the sludge and to form a sludge cake, compressing the sludge cake on the porous support at a pressure of from 10 to 300 kp/cm² to further dewater the sludge cake and discharging the dewatered sludge cake from the porous support.

6 Claims, 3 Drawing Figures

METHOD AND APPARATUS FOR DEWATERING THICKENED SLUDGE

BACKGROUND OF THE INVENTION

This invention relates to a process for removing liquid from thickened sludge by pressing.

Sludge comprising finely divided solids in admixture with a liquid, such as water, is a by-product obtained by many industrial processes. An example of such sludge is lime sludge which is a by-product obtained in the production of sugar.

In may cases the concentration of solids of sludge is relatively low, i.e., from 0.5 to 20% by weight, and in order to permit a satisfactory handling of such sludge it is, therefore, necessary to remove a substantial amount of water therefrom so as to form a thickened sludge.

Various apparatuses are suitable for producing thickened sludge. Examples of such apparatuses are continuous centrifuges, such as decanting centrifuges, belt presses in which the sludge is compressed between two continuously travelling belts and drum filters in which sludge is sucked onto a filter cloth mounted on the exterior surface of a rotating drum by means of a vacuum generated within said drum.

The thickened lime sludge formed by using such apparatuses ordinarily has a concentration of solids of between 15 and 55% by weight. The thickened lime sludge is a plastic mass which is neither liquid nor solid.

However, if subjected to a powerful mechanical treatment, e.g. pumping, the thickened lime sludge may be made flowable and in that condition it may be pumped and transported to sludge dewatering reservoirs. Such sludge containing reservoirs, which occupy large areas, often produce a bad smell because the sluge starts to putrefy during the relatively long periods of time in which the sludge has to remain therein in order to be dewatered.

After storage in such reservoirs, the dewatered lime sludge is removed therefrom and may be utilized as a fertilizer and/or a soil improving material.

It is desirable to remove further amounts of water than possible by storing lime sludge in sludge dewatering reservoirs in order to produce a solid dry product which can be handled in a more convenient manner than the dewatered sludge produced as described above.

It has been attempted to remove water from thickened sludge by pressing, and in a prior art apparatus the thickened sludge is introduced into a cylinder comprising a piston and means for draining off liquid and is compressed therein so as to form a sludge cake.

In practice, however, it has been found that it is very difficult to provide an efficient and stable packing between the piston and the cylinder, i.e., between the high pressure zone and the low pressure zone of such an apparatus.

The main object of the invention is to convert thickened sludge into a low moisture containing material by a process, which does not suffer from the drawbacks of the prior art process.

A further object of the invention is to increase the contration of solids of thickened sludge, e.g., from 15-55% to 20-90% by weight.

SUMMARY OF THE INVENTION

These and other objects and advantages which will appear from the following description are obtained by the process of the invention, which process comprises the steps of (1) depositing thickened sludge onto a porous support, (2) partially removing liquid from the thickened sludge by establishing a vacuum within said porous support, (3) compressing the partially dried sludge on said porous support at a relatively low pressure to remove additional liquid therefrom and to form a sludge cake, (4) subsequently compressing said sludge cake on said porous support at a relatively high pressure to remove further amounts of liquid therefrom, and (5) finally discharging the dried sludge cake from said porous support.

Surprisingly it has been found that due to the initial removal of liquid by suction through the porous support and the following compression of the partially dried sludge at a relatively low pressure, the properties of the sludge are changed in a manner such that the sludge cake can be compressed at a relatively high pressure without confining the sludge cake in a chamber which fits closely with the pressure head used for effecting the compression. Thus, it has been found that these initial treatments of the thickened sludge have the effect of making the sludge sufficiently solid to allow the sludge cake formed to be further compressed at a relatively high pressure without flowing out of the pressure zone. Consequently, the process of the invention does not require the use of packing or other sealing means to confine the sludge cake within the pressure zone.

Thus, by using the uncomplicated process of the invention, thickened sludge can be converted into a solid product having a sufficiently low concentration of liquid to allow such products to be handled in the same manner as ordinary dry products. Thus, the product obtained is sufficiently dry to be transported with conveyors ordinarily used for transporting solid materials and to be filled into sacks. Furthermore, the product obtained is capable of being spread on the fields as a fertilizer and/or soil improving material by using ordinary fertilizer distributors.

In a preferred embodiment of the precess of the invention the vacuum established in the porous support during the suction step is maintained during the following compression steps so as to facilitate the removal of liquid pressed out of the sludge.

The removal of liquid from thickened sludge by the process of the invention is preferably carried out by a cyclic process comprising the steps of establishing a vacuum within the porous support, passing the porous support through a bath of thickened sludge while maintaining said vacuum within the porous support so as to deposit at least one layer of thickened sludge on said support, passing the porous support to a compression zone while maintaining said vacuum in said porous support so as to effect a partial removal of liquid from the thickened sludge, compressing the sludge layer on said support at a relatively low pressure so as to form a sludge cake, increasing the pressure to a relatively high value so as to form a dried sludge cake and removing the dried sludge cake from the porous support by establishing a super-atmospheric pressure within said porous support.

After the removal of the dried sludge cake from the porous support, a vacuum may be established within said porous support and the steps described above may be repeated.

The compression of the sludge is preferably effected at pressures with the range of from 1 to 300 kp/cm$^2$ and most preferred from 10 to 300 kp/cm$^2$.

The invention also relates to an apparatus for carrying out the process described above.

The apparatus of the invention comprises a porous support connectable to a vacuum source, means for depositing thickened sludge onto said porous support, a pressure head for pressing thickened sludge against said porous support at increasing pressures so as to obtain a dried sludge cake and means for removing the dried sludge cake from said porous support.

A preferred embodiment of the apparatus of the invention further comprises a frame member and means for introducing said frame member on the porous support prior to the compression step and for removing said frame member from the porous support before the removal of the dried sludge cake therefrom.

This frame member merely serves to prevent liquid pressed out of the sludge from flowing out of the pressure zone and to guide such liquid into the porous support from which it is removed by suction.

A particularly preferred embodiment of the apparatus of the invention comprises a plurality of double-sided porous supports mounted on a common rotatable shaft, a container located below said rotatable shaft, means for introducing thickened sludge into said container, means for rotating said shaft so as to successively move said porous supports through a circular path passing through said container, a compression zone and a sludge cake discharge zone, means for creating a vacuum in said porous supports during their movement through said container and towards and into said compression zone, means for compressing thickened sludge deposited on said porous support in said compression zone and means for discharging sludge cakes from said porous supports in said sludge cake discharge zone.

By using such an apparatus, the removal of liquid from thickened sludge may be effected in a cyclic semi-continuous manner. Thus, when the sludge cakes have been removed from the porous support, the latter can be reintroduced in the container holding thickened sludge, and the whole process may be repeated.

The porous supports used in the process and the apparatus of the invention preferably comprise a hollow circular flat member having a plurality of passages communicating with the surfaces of said hollow member. The surfaces of said hollow member are preferably covered by filter discs and a layer of porous material coated on the exterior side by a filter cloth.

In order to facilitate the removal of water from the sludge, the pressure heads may also be provided with a filter disc covered by a layer of porous material and filter cloth and passage communicating with the backside of said filter disc. These passages are preferably connected to means permitting a vacuum or a super-atmospheric pressure to be established within the pressure head.

The process and the apparatus of the invention are suitable for drying a wide range of sludge products produced in various industries and production plants, such as lime sludge produced in the sugar industry and yeast sludge obtained in bakeries. Further, the process and the apparatus of the invention may be used for drying similar products obtained in the cement industry, porcelain industry, kaolin production plants, plants for chemical and biological purification of waste products, wood and cellulose industry, the ceramic industry and the mining industry.

DESCRIPTION OF THE PREFERRED EMBODIMENTS

Figure 1:
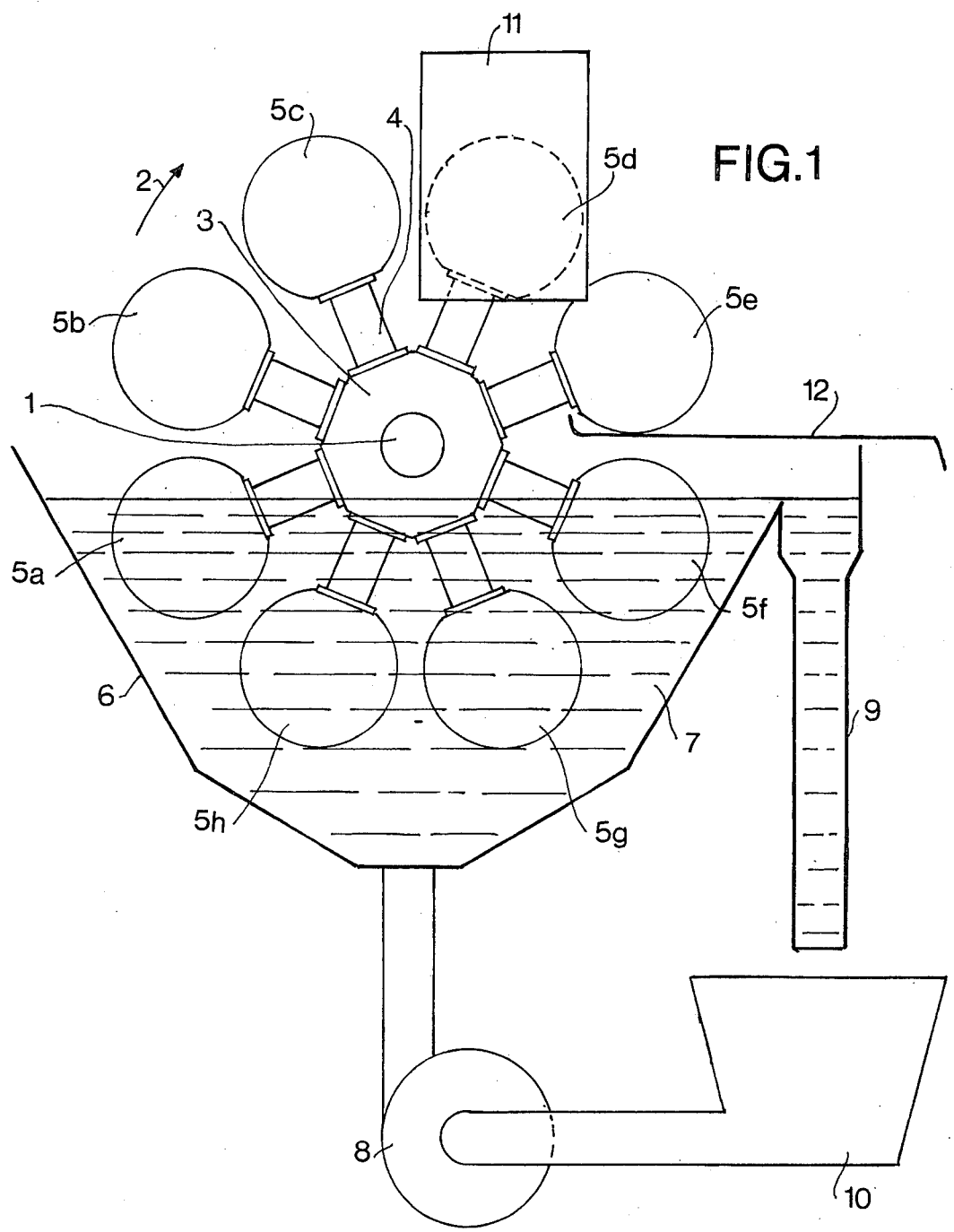
FIG. 1 schematically illustrates an embodiment of an apparatus of the invention.

The apparatus illustrated in FIG. 1 comprises a hollow shaft 1 mounted for rotation about a horizontal axis in the direction indicated by an arrow 2. A vacuum conduit (not shown) and a compressed air conduit (not shown) are mounted within the shaft 1. The shaft 1 is surrounded by a manifold 3, which is supporting eight hollow arms 4, each carrying at its outer end a filter element 5a – 5f. These filter elements may be of the type shown in FIG. 3. The manifold 3 is constructed in a manner so that the hollow arms 4 can be connected with the vacuum conduit and the compressed air conduit, respectively, or be closed relative to said conduits depending on the position of the filter elements 5a – 5f.

In the positions illustrated in FIG. 1, the arms 4 of the filter elements 5a – 5d and 5g – 5h are connected with the vacuum conduit, whereas the arms of the filter elements 5e and 5f are closed relative to the vacuum and compressed air conduits. During the movement of the filter elements between the positions corresponding to filter elements 5d and 5e, the filter element is connected with the compressed air conduit for a short time.

A container 6 is located below the assembly of filter elements so that the filter elements during their rotation pass through said container. The container 6 is adapted to hold a bath 7 of thickened sludge, which is to be converted into dry sludge cakes. The container 6 is connected with a pump 8 for supplying thickened sludge to the container. The container 6 further comprises an overflow pipe 9 terminating above a funnel 10 which communicates with the pump 8. This system permits the thickened sludge contained in the container 6 to be continuously circulated.

Figure 2:
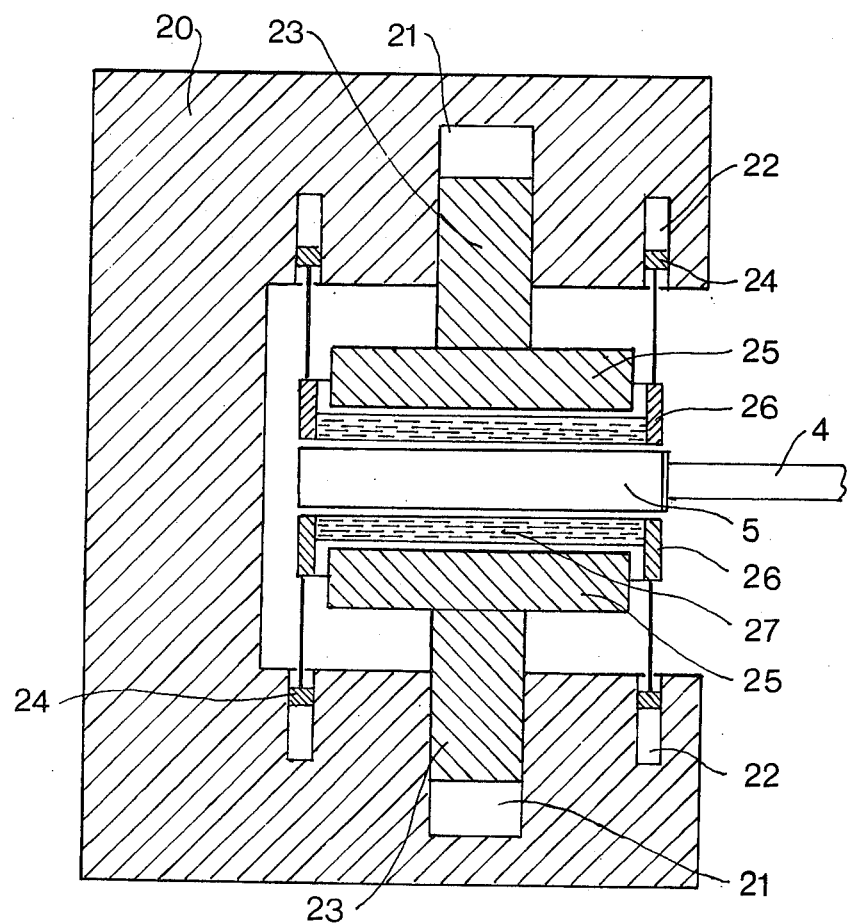
FIG. 2 shows a cross-sectional view of a compression station of the apparatus shown in FIG. 1.

The apparatus also comprises a compression station 11 which is illustrated in detail in FIG. 2 as well as two trays 12 which are spaced apart so as to allow the filter elements to pass between said trays 12 during the rotation of the assembly of filter elements. The outer edges of the trays 12 terminate outside the apparatus and may be associated with means (not shown) for removing dried sludge cakes.

The compression station 11 illustrated in FIG. 2 comprises a U-shaped metal yoke 20 comprising two high pressure cylinders 21. The yoke 20 also comprises four hydraulic cylinders 22. A high pressure piston 23 is mounted in each cylinder 21, and a hydraulic piston 24 is mounted in each hydraulic cylinder 22. Each pressure piston 23 is connected with a press head 25, and each set of hydraulic pistons 24 located adjacent to a high pressure piston 23 is connected to an annular frame member 26. In the position of the assembly of filter elements shown in FIG. 2, a filter element 5 mounted on a hollow arm 4 is located between the two press heads 25, and a sludge layer 27 is confined in the space between each press head 25 and the adjacent surface of the filter element.

The apparatus illustrated in FIGS. 1-2 operates in the following manner:

During the rotation of the filter elements through the bath 7 of thickened sludge contained in the container 6, thickened sludge is sucked onto the surfaces on said filter elements 5 as a result of the vacuum maintained within said filter elements. The thickness of the sludge layer may be between 5 and 100 mm, when the filter elements 5 and the sludge layers deposited thereon move out of the sludge bath 7. The sludge layers are caused to adhere to the filter elements during the movement towards the compression station due to the vacuum maintained within said filter elements. When a filter element reaches the compression station 11, the rotation is stopped. The hydraulic cylinders 22 are then activated so as to bring the annular frame members 26 in contact with the edge portions of the filter element 5. Subsequently, the high pressure cylinders 21 are activated so as to cause the press heads 25 to move synchronously towards the filter element 5 and to exert a pressure on the sludge layers adhering to said filter element. The pressure exerted is gradually increased to a predetermined maximum value. Due to the vacuum maintained within the filter element 5, liquid pressed out of the sludge layers is removed through the hollow arm 4.

Finally, the hydraulic pistons 24 and the high pressure pistons 23 are caused to withdraw.

The assembly of filter elements 5 is then rotated (360/8) = 45° and during said movement the filter element moving from the compression station towards the trays 12 is connected with the compressed air conduit so as to produce a super-atmospheric pressure within the filter element and to disengage the dried sludge cakes from the filter element. These dried sludge cakes fall unto the trays 12 and are then removed.

Figure 3:
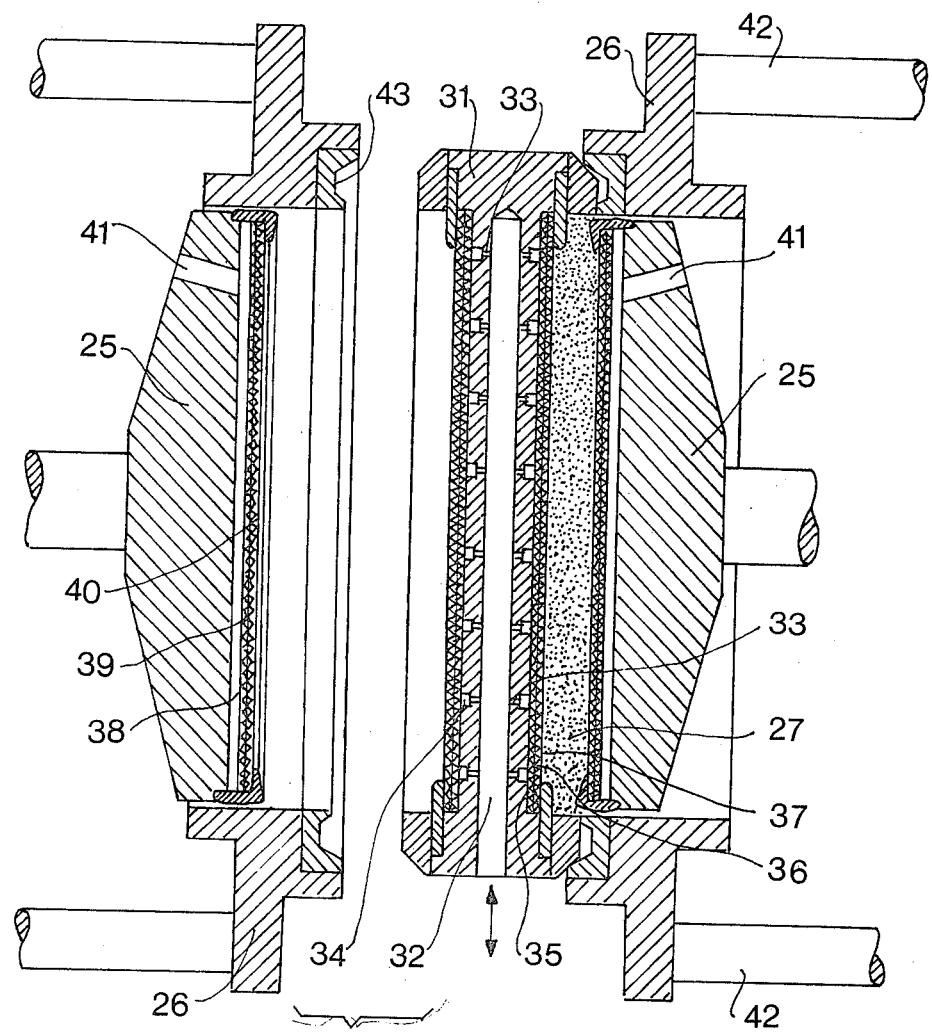
FIG. 3 shows a cross-sectional view of a preferred embodiment of a porous support and cooperating pressure heads of an apparatus according to the invention, the left side of FIG. 3 showing the positions of the pressure head, frame member and porous support before the compression of the sludge and the right side of the drawing showing the positions of these components during the compression of the sludge. It should be mentioned, however, that in practice the compression takes place simultaneously on both sides of the porous support.

The filter element illustrated in FIG. 3 comprises a circular core element 31 made from a plastics material or another light-weight material. The core member 31 has a bore 32 which through passages 33 is connected to a series of concentric grooves 34 provided in the surfaces of the core member 31. Each groove surface of the core member 31 is covered by a filter disc 35 coated with a layer of a porous material, which in turn is covered by a filter cloth 37.

The press heads 25 also comprises a combination of a filter disc 38, a layer 39 of a porous material and a filter cloth 40. Furthermore, the pressure heads 25 are provided with passages 41 which can be connected with a vacuum source and a source of compressed air, respectively.

The frame members 26 which are supported by piston rods 42 have front faces 43 which are adapted to engage with the peripheral edge of the filter element so as to align the filter element with the pressure head during the compression of the sludge layer 27.

During the initial portion of the compression of the sludge layers 27, the pressure heads are pressed against said layers at a pressure of the order of 1-10 kp/cm² so as to partially dewater the sludge layers. The water pressed out of the sludge layers is removed through the bore 32 and the passages 41.

During this initial compression the structure of the sludge layer changes and the initial plastic mass which tends to flow when strongly compressed becomes a solid rigid cake. When the pressure subsequently is increased from 1-10 kp/cm² to 30-300 kp/cm², additional water is removed and a dry solid coherent cake is obtained.

The compression may be effected with a press head which does not fit closely to the wall member, and the distance between the periphery of the press head and the wall member may even be up to 5 mm without risking that substantial amounts of the sludge cake are pressed into said space.

I claim:

1. A process for dewatering thickened sludge comprising the steps of:
    (1) depositing thickened sludge onto a substantially flat, porous support of an intermittently rotating vacuum deposition means which comprises a plurality of such radially displaced supports,
    (2) partially dewatering the thickened sludge by continuously establishing a vacuum within said porous support,
    (3) intermittently compressing the partially dewatered sludge on said porous support at a pressure of from 1.0 to 10.0 kp/cm² to further dewater the sludge and to form a sludge cake,
    (4) intermittently compressing said sludge cake on said porous support at a pressure of from 10.0 to 300.0 kp/cm² to further dewater the sludge cake amounts of liquid therefrom and
    (5) intermittently discharging the dewatered sludge cake from said porous support.

2. A process according to claim 1, wherein the vacuum established in the porous support during the partial dewatering step is maintained during the following compression steps.

3. A process according to claim 1, comprising the further steps of passing the porous support through a bath of thickened sludge while maintaining said vacuum within the porous support so as to deposit at least one layer of thickened sludge on said support, passing the porous support to a compression zone while maintaining said vacuum in said porous support so as to effect a partial removal of liquid from the thickened sludge, compressing the sludge layer on said support at the pressure of from 1.0 to 10.0 kp/cm² so as to form the sludge cake, increasing the pressure to the 10.0 to 300.0 kp/cm² value so as to further dewater the sludge cake, and removing the dewatered sludge cake from the porous support by establishing a super-atmospheric pressure within said porous support.

4. An apparatus for dewatering thickened sludge, comprising vacuum deposition means, including a plurality of radially displaced porous supports, means for depositing the thickened sludge onto said support, vacuum means connected to said support for establishing a vacuum therewithin for partially dewatering the thickened sludge, a pressure head zone means for pressing the partially dewatered sludge against said support at a pressure of from 1.0 to 10.0 kp/cm² to form a sludge cake and thereafter at a pressure of from 10.0 to 300.0 kp/cm² to further dewater the sludge cake, sludge cake removal means for removing the dewatered sludge cake from said support, and means to intermittently rotate said vacuum deposition means so as to intermittently pass each of said porous supports through each of said zone means.

5. An apparatus according to claim 4, further comprising a frame member and means for introducing said frame member on the porous support before the sludge is pressed and for removing said frame member from the porous support before the removal of the dried sludge cake therefrom.

6. An apparatus according to claim 4, further comprising a plurality of double-sided porous supports mounted on a common rotatable shaft, a container located below said rotatable shaft, means for introducing thickened sludge into said container, means for rotating said shaft so as to successively move said porous supports through a circular path passing through said container, a compression zone and a sludge cake discharge zone, said vacuum means being connected to said porous supports for creating a vacuum therein during their movement through said container and towards and into the compression zone, said pressure head compressing the thickened sludge deposited on one of said porous supports in said compression zone, and said removing means discharging the sludge cakes from said porous supports in said sludge cake discharge zone.

* * * * *